United States Patent

[11] 3,600,660

[72] Inventor William A. Ford
Southfield, Mich.
[21] Appl. No. 745,243
[22] Filed July 16, 1968
[45] Patented Aug. 17, 1971
[73] Assignee Ford Motor Company
Dearborn, Mich.

[54] ELECTRONIC CONTROL SYSTEM FOR A MULTIPLE AXIS PROBE FOR OBTAINING COORDINATE DATA FOR SURFACE POINTS ON A THREE-DIMENSIONAL SURFACE
9 Claims, 12 Drawing Figs.

[52] U.S. Cl. .................................................. 318/578, 318/654
[51] Int. Cl. .................................................. G05b 19/36
[50] Field of Search ............................................ 318/568, 578, 608, 654

[56] References Cited
UNITED STATES PATENTS

| | | | |
|---|---|---|---|
| 3,100,859 | 8/1963 | Bentkowsky ............... | 318/20.270 |
| 3,457,484 | 7/1969 | Shimizn et al. ............ | 318/20.160 |
| 3,481,577 | 12/1969 | Fling ......................... | 318/20.160 |
| 2,410,295 | 10/1946 | Kuehni et al. ............. | 318/20.160 UX |
| 2,470,244 | 5/1949 | Fryklund ................... | 318/20.160 X |
| 2,475,245 | 7/1949 | Learer et al. .............. | 318/20.102 |
| 2,559,575 | 7/1951 | Fryklund et al. .......... | 318/20.160 X |
| 2,916,342 | 12/1959 | Neergaard ................. | 318/20.102 X |
| 3,059,236 | 10/1962 | Marantette et al. ....... | 318/20.102 X |
| 3,366,934 | 1/1968 | Kelsey ....................... | 318/20.102 X |

Primary Examiner—T. E. Lynch
Attorneys—John R. Faulkner and Donald J. Harrington ABSTRACT: A control system for a three dimensional surface probe used for measuring and recording the coordinates of points on a surface including a course adjustment feature and a fine adjustment feature whereby the probe may be steered by an operator over the surface, each adjustment feature includes operator-controlled electric motors and a probe position sensor in the probe for interrupting the motion applied to the probe by the motors when the probe reaches a surface contacting position.

Fig. 6
Y-AXIS

ELECTRONIC CONTROL SYSTEM FOR A MULTIPLE AXIS PROBE FOR OBTAINING COORDINATE DATA FOR SURFACE POINTS ON A THREE-DIMENSIONAL SURFACE

GENERAL DESCRIPTION OF THE INVENTION

This specification describes a control system for controlling the motion of a surface probe that engages a three-dimensional surface, such as the surface of a clay model used in automotive body engineering and styling as the coordinates of selected points on characteristic lines on the surface are read and recorded.

The control system of my invention permits the operator of the probe to steer the probe tip from one measured point to another by means of appropriate hand adjustments. The operator-controlled element may be the input element of an electrical resolver or other voltage control element, the output voltage signals being distributed to separate control servos and feedback circuits for each of two coordinate axes of the probe. An automatic, closed-loop, servo position control for the third coordinate axis of the probe maintains the desired coordinate position for the probe for the third axis as manual adjustments for the first two axes are made by the operator. A separate electrical pulse transducer is provided for obtaining coordinate readings for each of the three coordinate axes. This data is transferred to a card-punch machine and used in a computer-assisted data processing procedure for preparing numerical control tape, which in turn is used as an intelligence medium for a numerically controlled machine tool used in machining a finished surface conforming to the original model surface.

The probe comprises a stationary base that is mounted for shifting movement in the direction of a first coordinate axis. A vertical pedestal carried by the base mounts a probe arm, the end of which carries a model engaging probe. The arm may be raised and lowered on the pedestal, the axis of which coincides with the axis of a second coordinate axis. The axis of the arm carried by the pedestal corresponds to the third coordinate axis.

Reference may be made to the copending application of Earle H. Stevenson, et al., Ser. No. 638,382, now Pat. No. 3,566,479, filed May 15, 1967, for a disclosure of a multiple axis probe assembly capable of being used with the control system of my invention. That application supplements this disclosure.

A separate servomotor and position feedback control system is provided for each of the three coordinate axes. Any two axes that are selected by the operator can be used to establish controlled motion of the probe as the probe is moved from one surface point to another along a characteristic line on the surface of the model. Both coarse adjustments and fine adjustments in the direction of each axis is achieved, the fine adjustments and the speed of travel of the probe for each of the two selected axes being achieved by varying the input voltages for each of the two closed-servo-loop systems for their respective axes. This is done in a single control procedure by the operator, which includes manual adjustment of the rotary element of an electrical resolver. The output voltages of the resolver are distributed separately to each of the two closed servo systems for the steering control axes.

In an alternative embodiment of my invention, voltage variations for the respective servo-loop systems can be achieved by a single control such as a two-axis potentiometer assembly. The output voltage of the potentiometer is proportional to motion of the input control element of the potentiometer assembly with respect to one axis. This generates one voltage signal. The corresponding adjustment of the control member with respect to the other axis is out of phase with respect to the first axis and develops a second signal. Both signals are received by separate subcircuits for the closed loop servosystems for each of the two selected control axes. Motion of the probe with respect to the third axis is obtained as the probe pressure on the probe triggers the operation of the control transformer. The output signal is distributed to a servomotor which positions the probe with respect to the third axis.

BRIEF DESCRIPTION OF THE FIGURES OF THE DRAWINGS

FIGS. 6 and 7 are circuit diagrams in block form showing the principal elements of the motion controls for each of the three coordinate axes for the probe assembly.

PARTICULAR DESCRIPTION OF THE INVENTION

Figure 1:
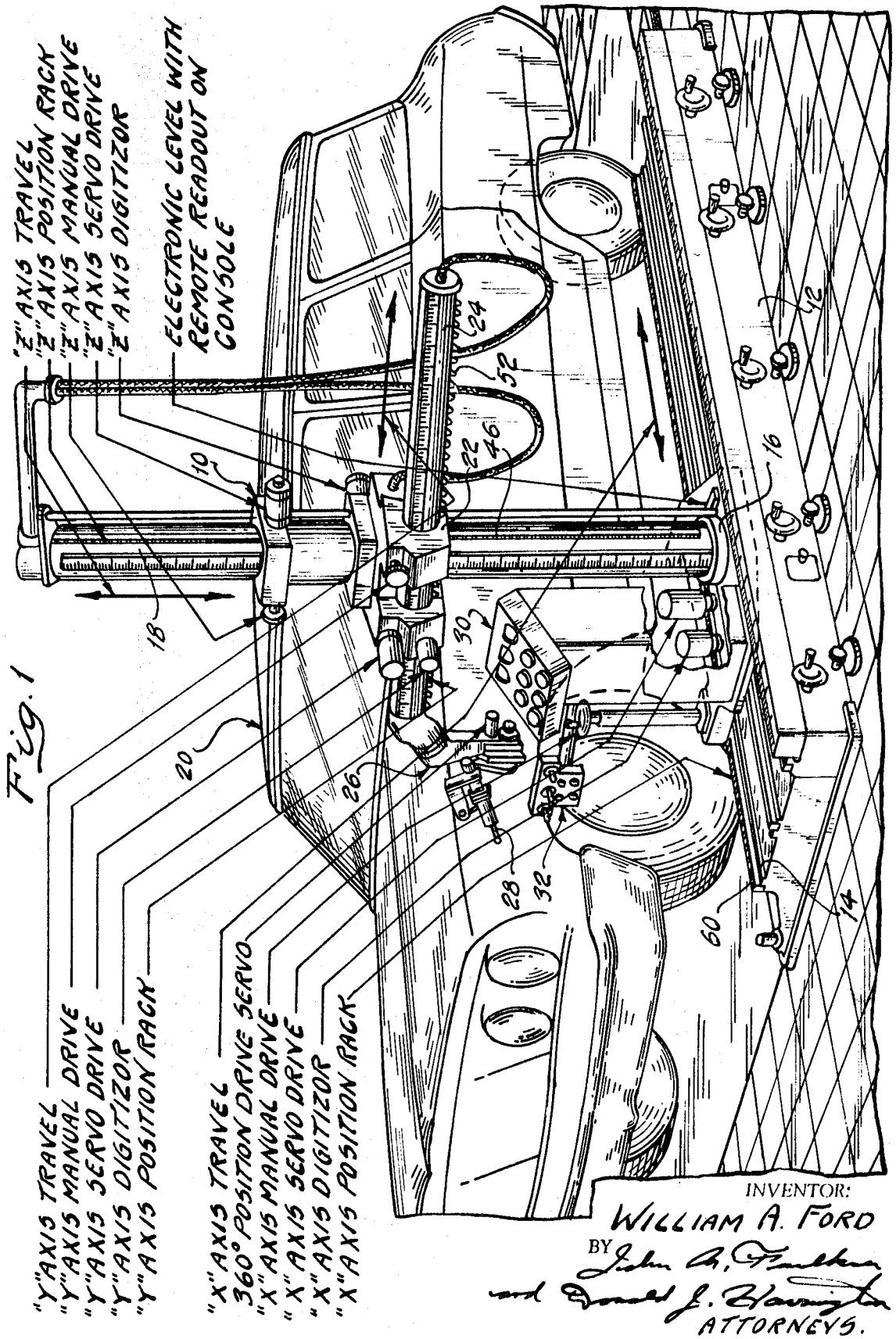
FIG. 1 shows a schematic, isometric view of a scanner and probe assembly capable of embodying the improved control system of my invention.
Figure 2:
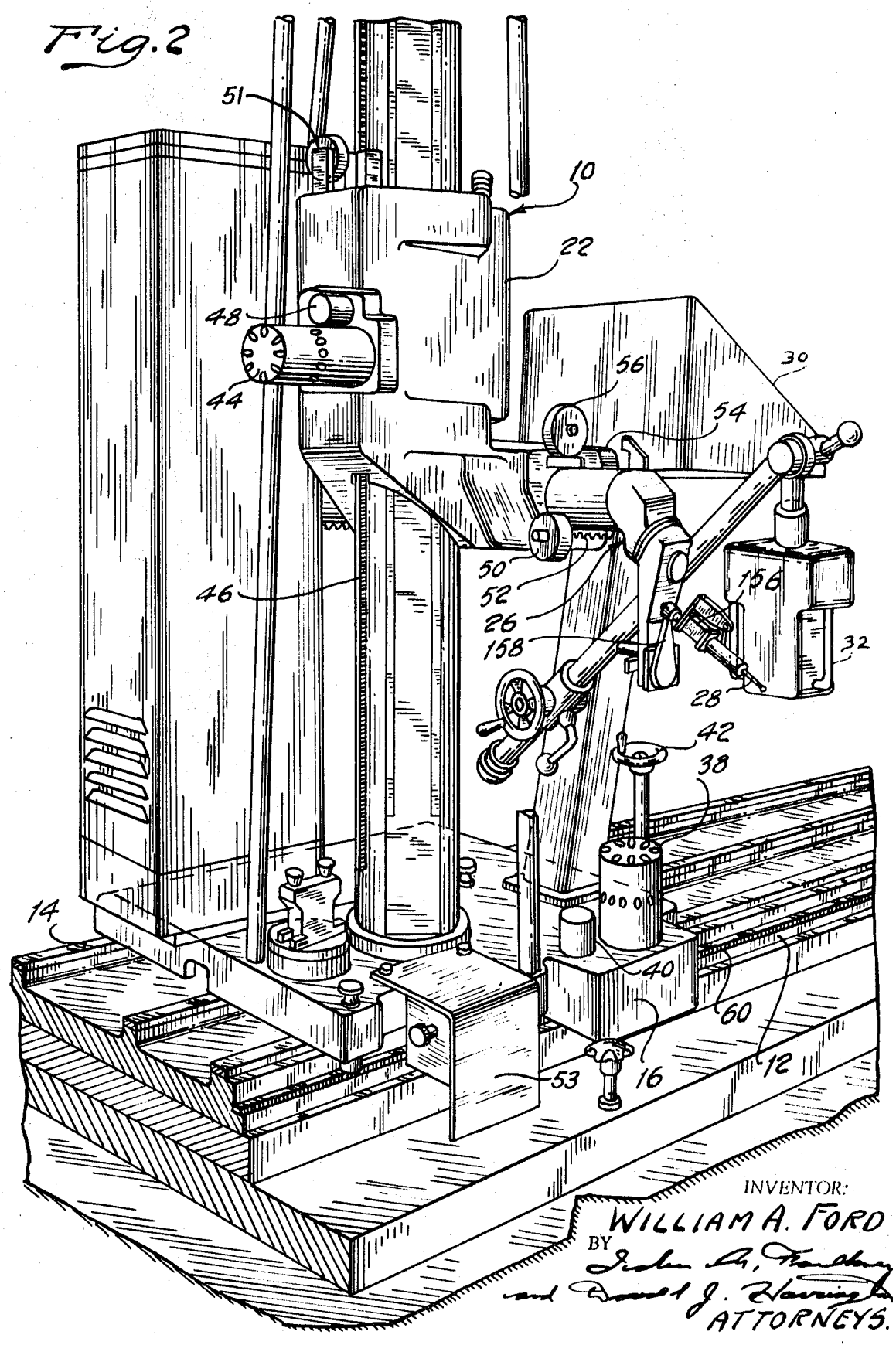
FIG. 2 is an isometric elevation view of a scanner and probe assembly of FIG. 1.
Figure 3:
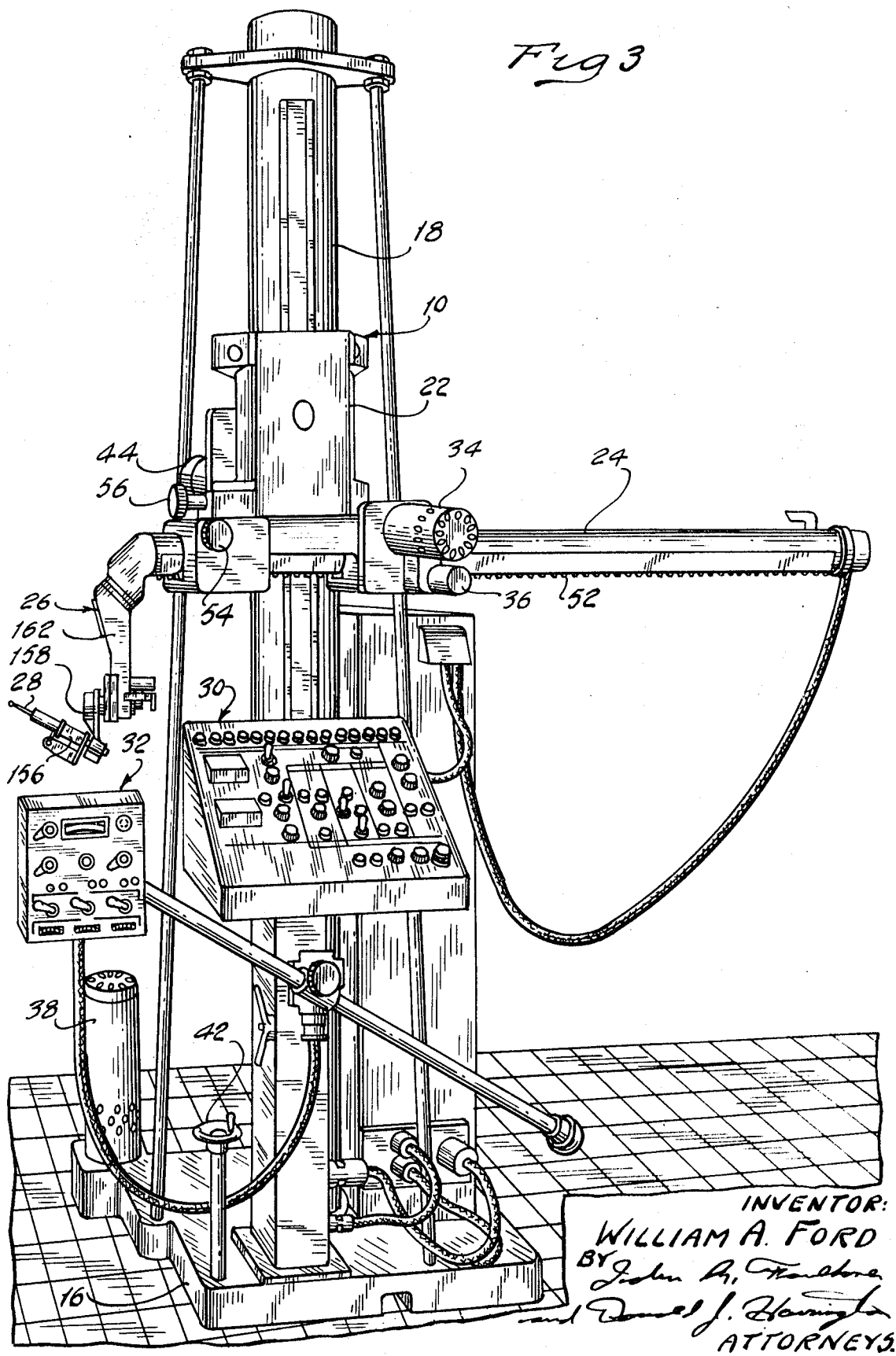
FIG. 3 is an elevation assembly view showing the front of the structure shown in FIG. 2.

In FIGS. 1, 2 and 3 the scanner is designated generally by reference character 10. It is mounted on a base 12 which can be positioned at any convenient location on the floor of the styling studio. The base 12 is formed with trackways 14 which are engaged by scanner-supporting rollers mounted in the foot 16 of a vertical pedestal 18 for the scanner 10. The base 12 is located adjacent an automotive vehicle body clay model 20 on which characteristic lines are developed.

The pedestal 18 carries a support 22, which forms a collar about the pedestal 18. The support 22 provides a bearing support for a horizontal arm 24 which moves in a horizontal direction perpendicular to the direction of motion of the pedestal 18 on the track 14. One end of the arm 24 carries a probe head 26 having a probe element 28 which is adapted to engage the surface of the model 20. The arm 24 can be advanced and retracted along its axis, which corresponds to the transverse coordinate axis. The direction of motion of the pedestal along the track 14 corresponds to the longitudinal coordinate axis. A control panel 30 is supported on the footing 16. It carries remote control automatic switching elements and manually adjustable hand wheels for controlling the motion of the probe 28. An additional pendant control 32 is provided to support additional control elements that will be described subsequently.

A horizontal axis drive motor is located at 34. A horizontal axis position synchro or control transformer 36 is carried by the housing to which the motor 34 is assembled. A longitudinal axis drive motor 38 is carried by the footing 16. Adjacent the motor 38 is a longitudinal axis position synchro or control transformer 40. A longitudinal axis manual adjustment 42 in the form of a handwheel turns a pinion that is engageable with a rack, the latter extending in a longitudinal direction. It is carried by the base 12. A vertical axis position synchro or control transformer 48 forms a part of the assembly of the motor 44, and it engages a rack 46.

A horizontal axis position digitizer is shown at 50. It engages drivably a rack 52 formed on the lower portion of the arm 24.

A manual horizontal adjustment in the form of a handwheel is shown at 54. This actuates a frictional wheel which engages the upward surface of the arm 24 so that the latter can be adjusted in the direction of the horizontal axis. A corresponding vertical axis manual adjustment in the form of a handwheel is shown at 56.

A vertical axis position digitizer 51 drivably engages rack 46. A longitudinal axis position digitizer enclosed by bracket 53 engages rack 60.

Figure 4:
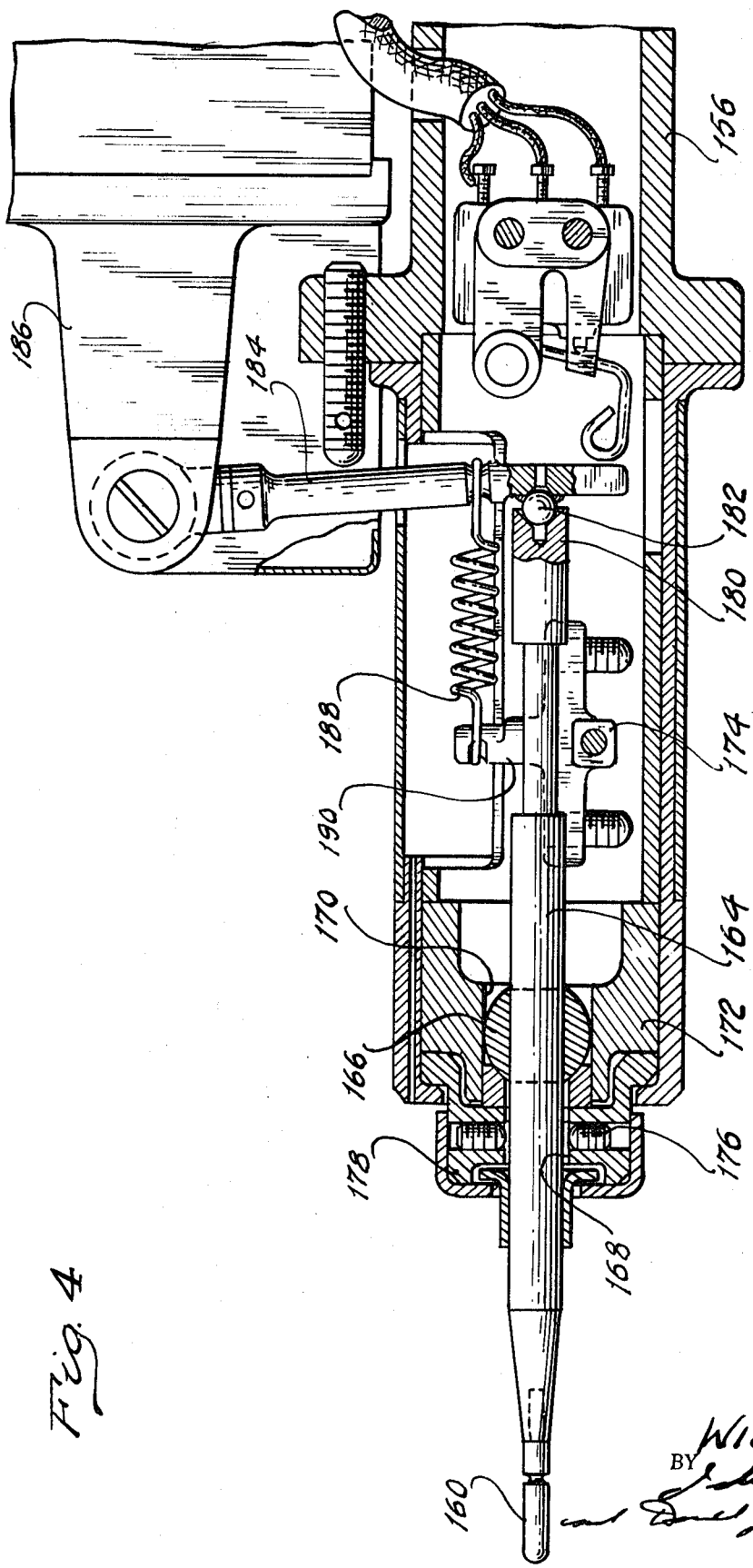
FIG. 4 is a cross-sectional view of the probe head which forms a part of the probe assembly.

The side of the base 12 has secured thereto a channel-shaped bracket 58, as indicated in FIG. 4. The gear rack 60, the axis of which extends in the direction of the longitudinal axis, is carried by bracket 58.

Figure 5:
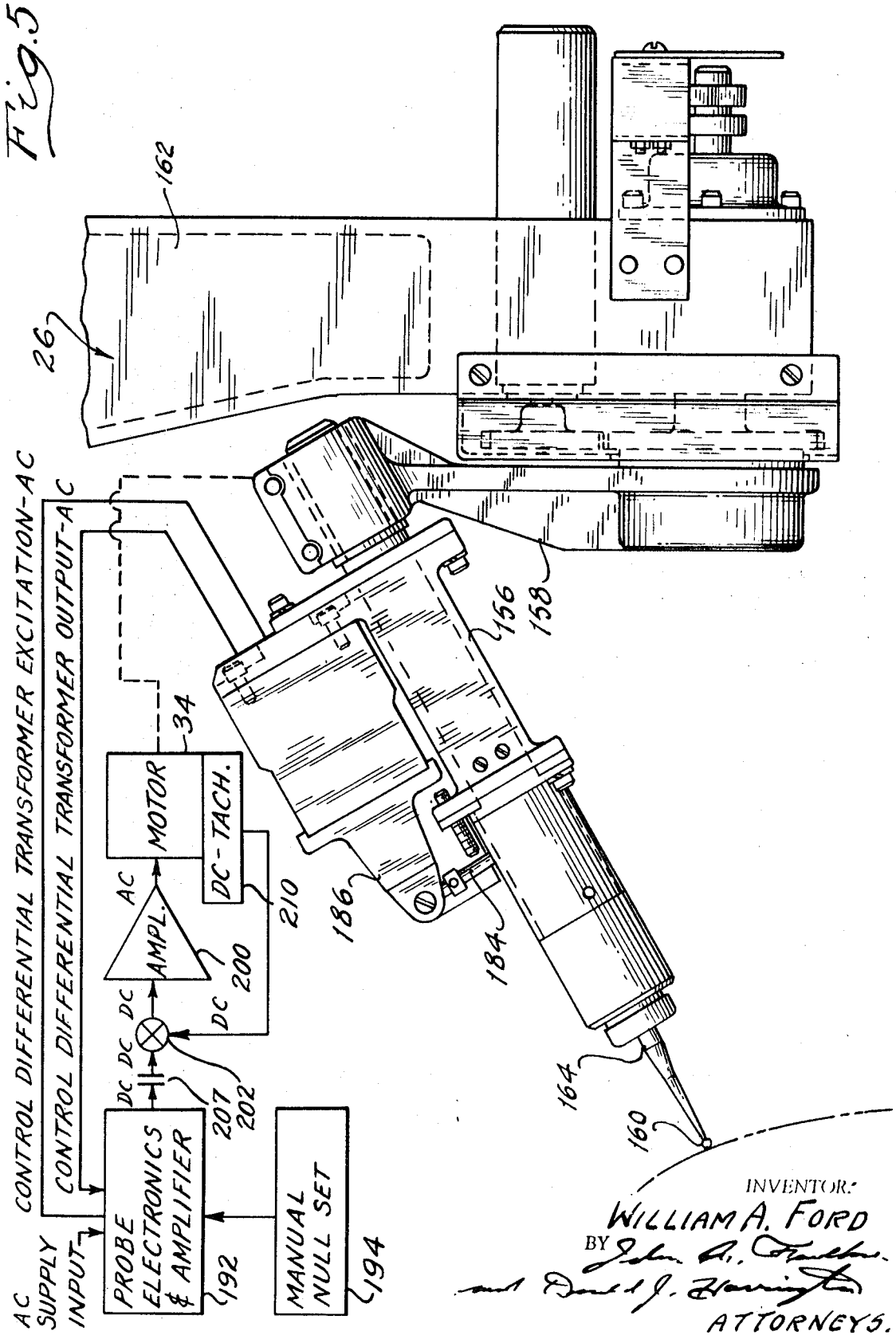
FIG. 5 is a schematic representation of the probe head of FIG. 4, together with the closed servo loop in block diagram form associated therewith.

The probe head, as indicated in FIGS. 4 and 5 includes a sleeve 156 which is carried by a first rotary member 158 of the probe head. This is mounted for rotation about an axis that contains the center of curvature of the probe tip 160. Member 158 in turn is carried by a second rotary member 162 of the probe head, which is adapted for oscillation about an axis that also contains the center of curvature of the tip 160. The member 162 is carried by the end of the arm 24.

The probe head of FIG. 4 can be adjusted about multiples axes without changing the position of the probe tip with respect to the reference point in space.

The tip 160 is carried by a probe shaft 164 around which a universal socket element 166 is positioned. This is formed with a cylindrical bearing surface which is engaged by an internal cylindrical bearing surface in companion socket member 168. The members 166 and 168 are received within a cylindrical opening 170 formed in bearing adapter 172. This is received within a housing shell 174 that in turn is secured at its right-hand end to the sleeve 156. Manually adjustable set-screws 176 positioned in closure member 178 limit the angular displacement of the probe tip 116 about the center of oscillation of the universal socket member 166.

The right-hand end of the shaft 164 carries a cam element 180 with a conical end surface formed therein. A cam ball 182 engages the conical cam surface. It in turn registers with a ball seat recess. The lower end of an actuator arm 184 for a control differential transformer 186 includes a hub that is held fast to the sleeve 156. Movement of the arm 184 about its pivotal axis creates a voltage that is proportional to the displacement of the arm 184. The arm 184 normally is urged in a clockwise direction, as viewed in FIG. 11, by control spring 188 which is anchored to an anchor post 190 which is fixed to the housing shell 174.

Displacement of the tip 160 in the direction of its axis will result in an angular displacement of the arm 184 thereby creating a signal voltage. Similarly, angular displacement of the tip 160 with respect to the axis of oscillation of the spherical bearing socket member 166 will result in a camming action of the ball 182 on the conical cam surface of the member 180, thereby again displacing the arm 184 to produce a signal that is an indicator of the magnitude of the displacement.

As indicated in FIG. 5, the output voltage signals of the control differential transformer are distributed to an amplifier 192, which in turn powers the horizontal axis drive motor 34. The mechanical connection between the armature motor 34 and the arm 24 causes the arm 24 to be adjusted with a follow up motion until the displacement that originally caused the signal in the control differential transformer is eliminated. At that time the probe tip will have assumed a new horizontal axis position relative to any given point on the surface of the model. The zero reference point for the amplifier and motor can be established by a suitable manual null-set control element 194. Any deviation, in either a plus direction or a minus direction, from the preset zero value will result in a response of the motor to either advance or retract the probe tip.

Figure 6:
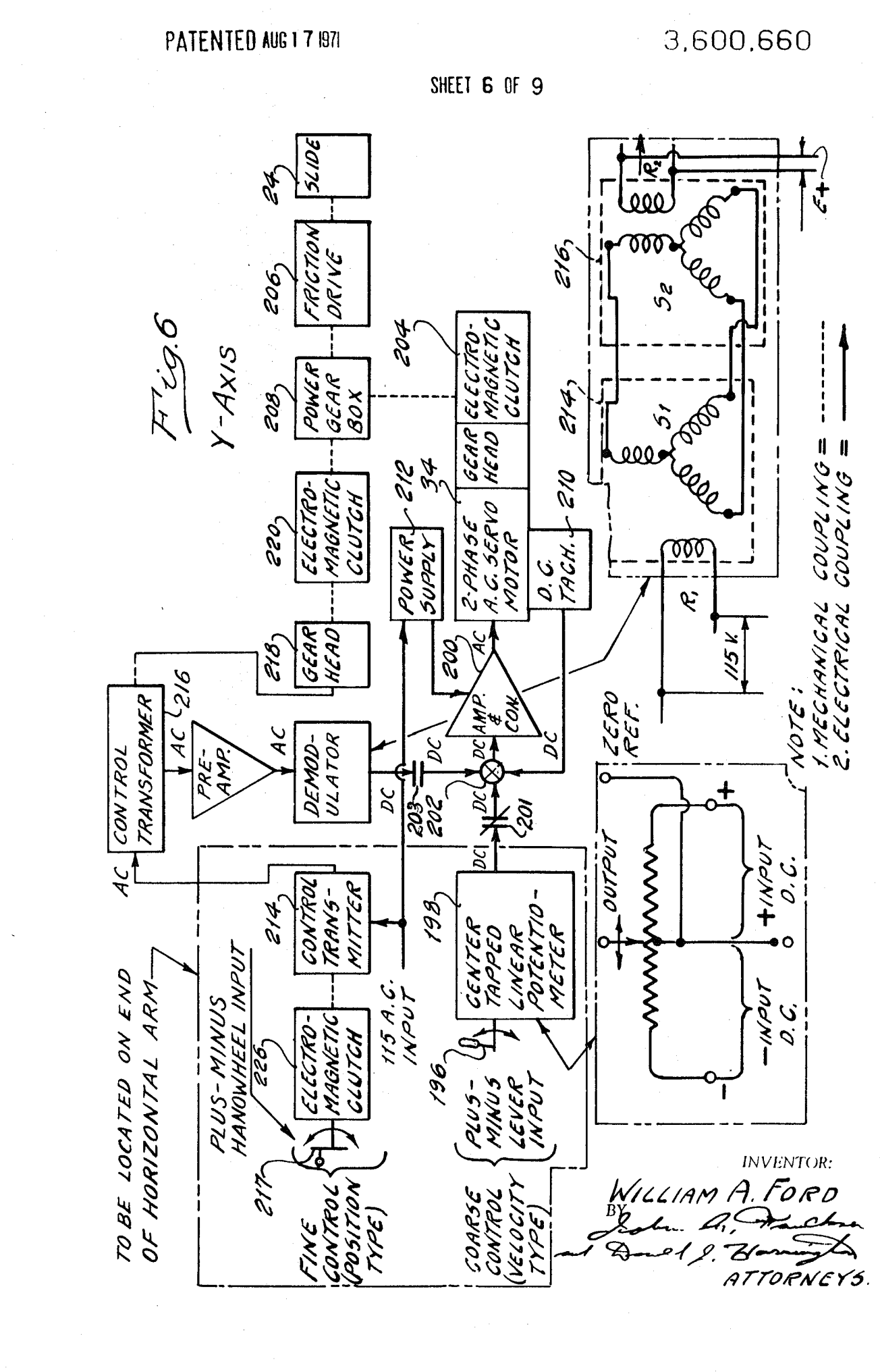

The control circuitry for controlling the motion of the probe in the y-axis direction is illustrated in block diagram form in FIG. 6.

Figure 7:
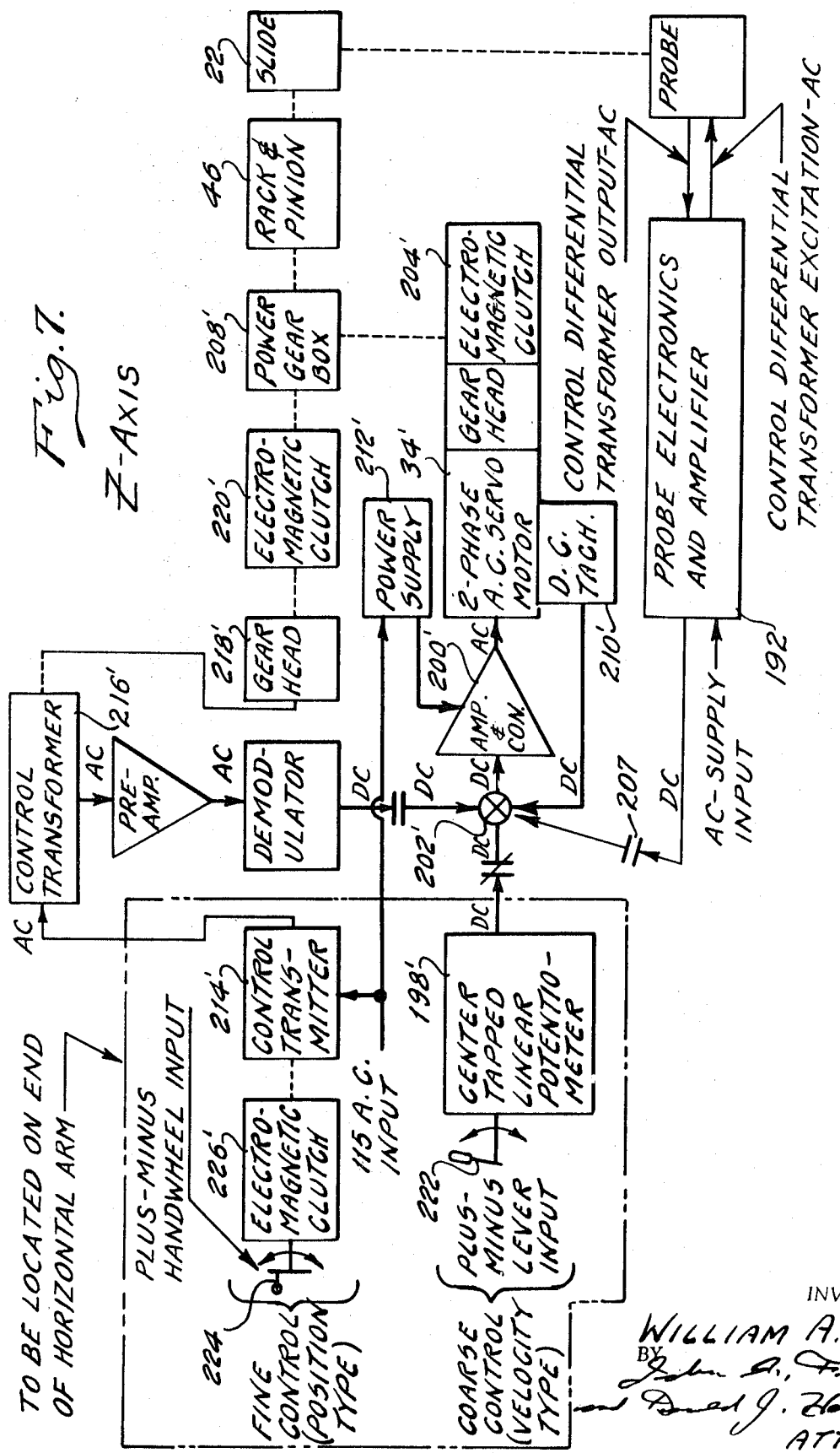

Similar circuitry may be used for each of the other two axes, the Z-axis circuitry being shown in FIG. 7 together with the closed loop motor feedback shown also in FIG. 5. This motor feedback loop is used also in the circuitry of FIG. 6 although it is not specifically illustrated. The same is true for the X-axis circuitry. Each control system includes a coarse position control and a fine position control. The coarse position control of FIG. 6 comprises an operator-controlled input lever 196 which may be located on the pendant 32, as seen in FIG. 1. This operates a center-tap, linear potentiometer 198 which provides a variable voltage that is directed to an amplifier 200 through a switch 201 and a summing point 202. The amplifier powers the two-phase AC servo drive motor 34 which is geared to an electromagnetic clutch 204. This in turn powers the slide, which isis the arm 24, through a friction drive 206 and through suitable gearing 208. An AC tachometer connected to the motor armature, as seen schematically at 210, distributes a control signal back to the summing point 202 thereby tailoring the velocity of the motor drive to a value that is dependent upon the position of the lever 196.

A suitable power supply for the amplifier is shown schematically at 212. This may be standard 115 AC voltage input. FIG. 6 shows schematically also a fine control for the horizontal axis drive motor 34. It is a so-called "position-type" that distributes an output signal that is proportional to the position of the rotor of a control transmitter 214. This rotor is indicated diagrammatically at R1.

The control transmitter 214 includes also a stator shown at S1, which is connected to a three-winding stator S2 of a control transformer 216 by means of a three-wire connection. The rotor R2 for the control transformer 216 is connected to the gearing 208 through a gear head 218 and an electromagnetic clutch 220. When the fine control is used, switch 203 is closed and switch 201 is open. When the coarse control is used, switch 201 is closed and switch 203 is open. Only one switch is open at any given time.

The output voltage signal E developed by a stator of the control transformer 216, which represents a lead error, is distributed to the summing point 202 through switch 203 and hence through the amplifier 200 to the servomotor 34. The motor drives the arm 24 through the mechanical torque delivery path indicated schematically in FIG. 14. The motion of the arm 24 is sensed by the rotor of the control transformer by reason of the mechanical connection established between the gearing 208 through the electromagnet clutch 220 and the gear head 218. Any adjustment of the fine control wheel 217 then will be followed by a followup motion of the rotor R2 as the arm 24 responds.

A corresponding fine control and coarse control for the vertical Z-axis adjustment is indicated in FIG. 7. The friction drive 206 in the FIG. 6 circuit has been replaced in the FIG. 7 circuit by the rack and pinion previously described and shown in part at 46. The member 22 in this case is the load. The load in the case of the axis is the pedestal itself. The operator-controlled coarse adjustment and fine adjustment for the longitudinal axis, as indicated in FIG. 13B and in FIG. 16, are designated by reference characters 219 and 221, respectively.

The corresponding manual control elements for the vertical axis are shown in FIG. by reference characters 222 and 224, respectively. An electromagnetic clutch is shown at 226 and 226′ and in FIGS. 6 and 7, respectively. This establishes a connection between the manual control element and the control transformer. For purposes of this description, the elements of FIG. 6 that are common to the circuit of FIG. 6 have been indicated by similar reference characters, although in FIG. 7 prime notations have been added.

By switching control element 228 on the control panel 30, the operator can select any two into which the control signals are to be distributed.

Control panel 30 serves also as a control station for initiating other control functions that do not have a direct relationship to my invention. These include a so-called "autoseek" cycle which will permit the operator to advance a probe to a preselected position on the model. As the probe contacts the model, the closed servo loop system for the probing axis servosystem is actuated.

When the operator selects any two of three coordinate axes during a probing operation, the third axis is controlled by the closed servo loop system described with reference to FIGS. 4 and 5, which includes control differential transformers and the adjustable probe tip. By varying the displacement of the rotor of the control transmitters for the two selected, such as the control systems of FIGS. 6 and 7, the operator can steer the probe over the surface of the model. He does this by controlling the position of the probe with reference to two coordinates. The position of the probe with respect to the third coordinate axis automatically is determined by the automatic control servo loop control for the probe head.

Figure 8:
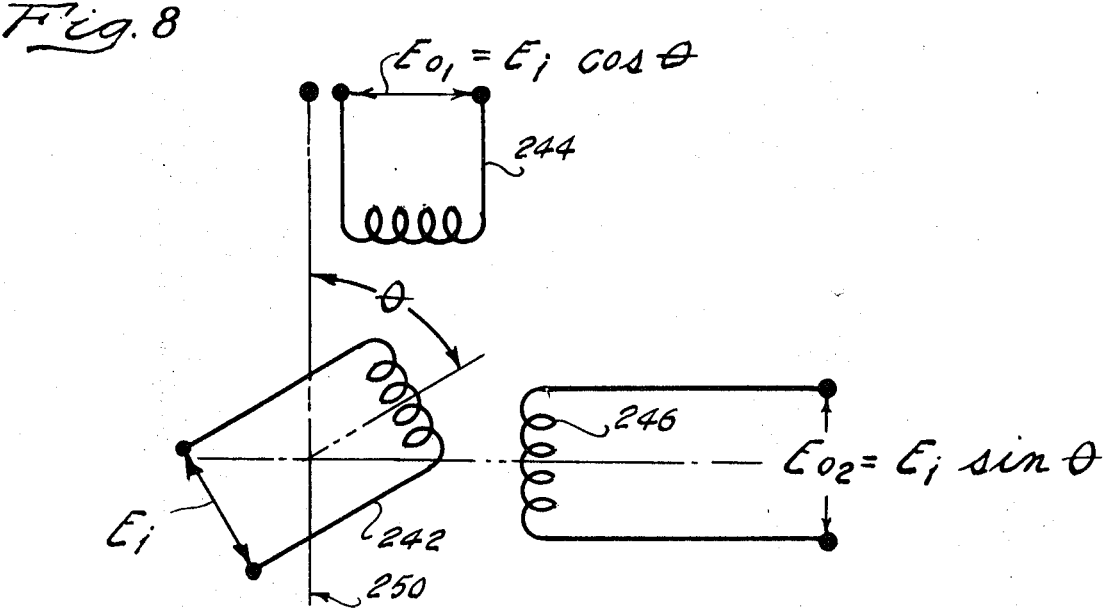
FIG. 8 shows in schematic form a resolver for developing electrical input signals for the control circuits of FIGS. 6 and 7.
Figure 10:
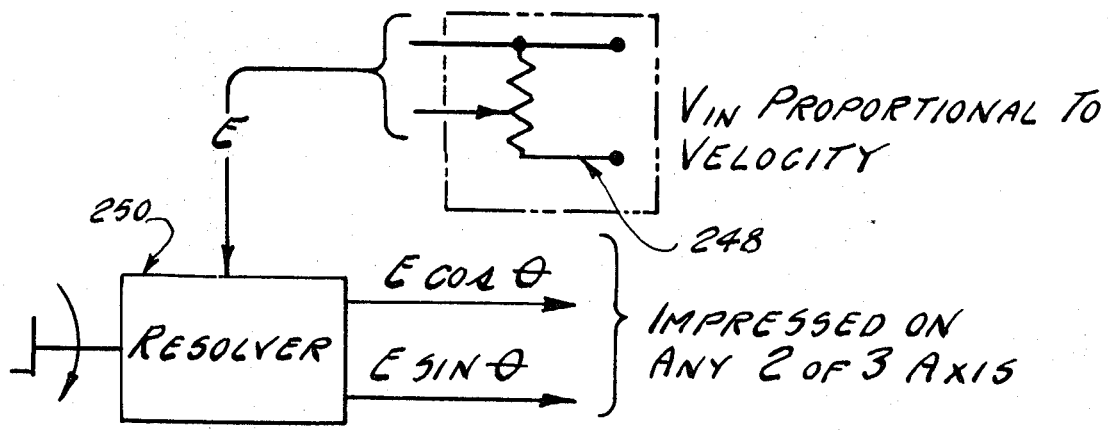
FIG. 10 is a schematic diagram showing the velocity control potentiometer for varying the input voltage to the resolver of FIG 8.

To assist in this steering control of the probe tip, I may employ a resolver such as that shown in FIG. 8. This includes a wound rotor 242 and two stator windings 244 and 246 situated 90° out of phase with respect to each other. An input voltage $E_i$ is impressed across the terminals of the rotor windings. The rotor may be rotated through any angle $\theta$ to produce a variable voltage output $E_{o1}$ and $E_{o2}$ for the stator windings 244 and 246, respectively. The output voltages on the stator are a function of the input voltage on the rotor and the angle $\theta$. $E_{o1}$ is equal to $E_i$ cosine $\theta$ and $E_{o2}$ is equal to $E_i$ sine $\theta$. Voltage $E_{o2}$ may be fed into the summing point 202 for the circuit of FIG. 6 if, indeed, the horizontal axis control system is selected by the operator as one of the two steering control axes. If the longitudinal steering control axis is the other selected axis, the voltage $E_{o1}$ is impressed on the summing point 202''. Thus by varying the angular position of the rotor 242 with respect to the stators 244 and 246, the variable input to each of the two axes can be established, and in this way the displacement of the load for each of the axes, namely, the arm 24 and the footing 16, can be varied as desired. To establish a velocity control in addition to the directional control, it merely is necessary to vary the magnitude of voltage $E_i$. This may be done by suitable control elements, namely, the resolver 250 and the potentiometer of 248 in FIG. 10. The output voltage for the potentiometer shown at E in FIG. 10 is distributed into the resolver rotor. The resolver then breaks this voltage into two components indicated in FIG. 10 as vector quantities E cosine $\theta$ and E sine $\theta$.

Figure 9:
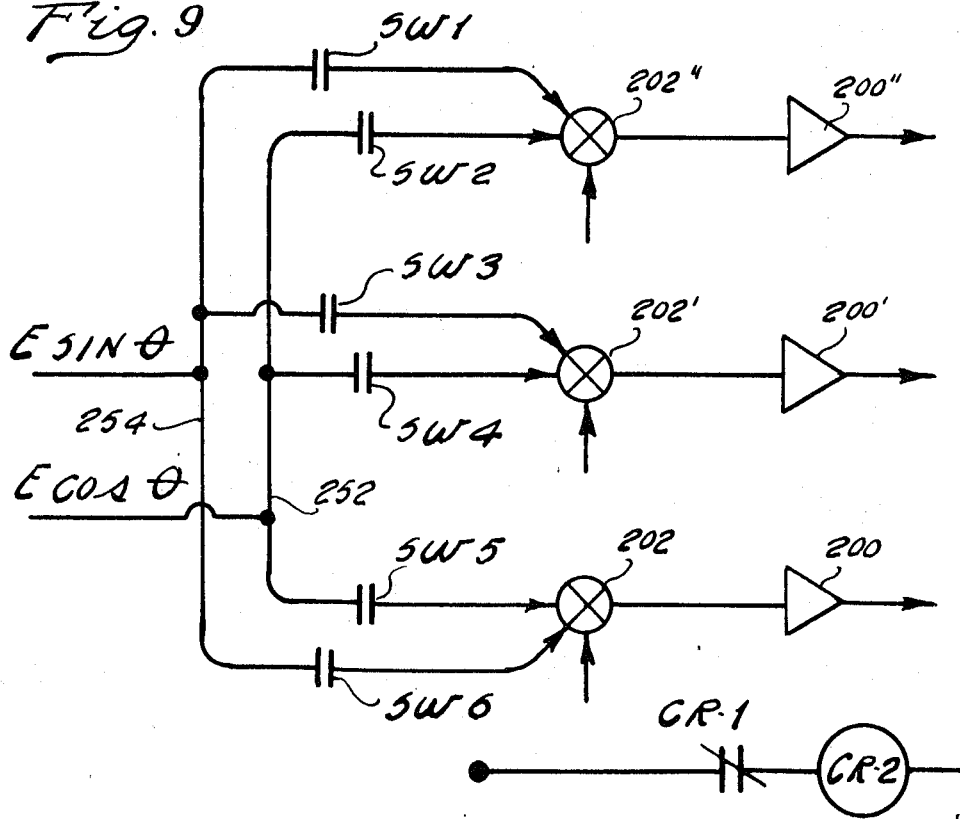
FIG. 9 shows in schematic form the switching diagram for directing the signals of the FIG. 8 resolver into the circuits of FIGS. 6 and 7 for the respective axes.

FIG. 9 simply shows in schematic form a switching function that is performed by the operator as he selects any two of the three axes. The summing points for circuits of FIGS. 6 and 7 circuits and the X-axis circuit are indicated in FIG. 9 at 202, 202' and 202'', respectively. The voltage E cosine $\theta$ signals developed by resolvers are distributed to the summing points through a first parallel circuit portion 252. The companion parallel circuit portion 254 distributes the E sine $\theta$ components of the resolver output signals to the summing points for each of the coordinate axis circuits. The switches activate and deactivate two of the three circuits, which for this purpose are indicated schematically in FIG. 9 at SW1 through SW6.

Switch 207 shown in FIG. 7, completes the feedback loop circuit for the third axis as the first two axes are under the manual control of the operator. Switch 207 can connect the feedback loop circuit to any one of the three summing point 202, 202' or 202''.

Figure 11:
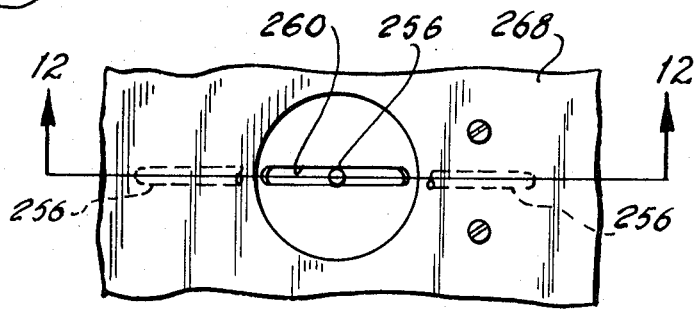
FIGS. 11 and 12 show a mechanical joystick control for developing input voltages for any two of the control circuits of FIGS. 6 and 7.
Figure 12:
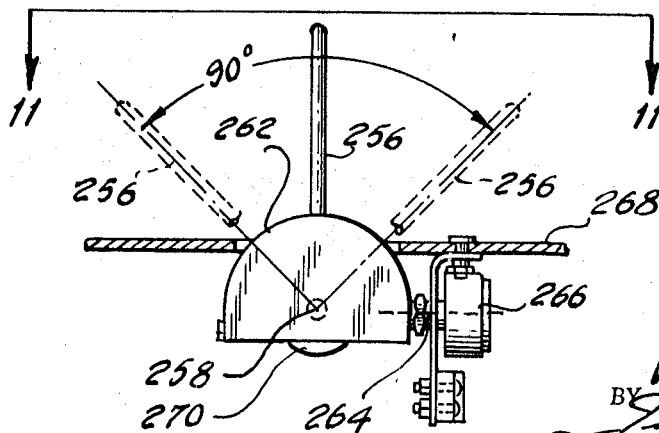

In FIGS. 11 and 12 I have illustrated an alternate control element for actuating the steering system. This comprises a so-called "joystick" 256, which is carried by a pivot shaft having an axis 258. The control stick 256 extends through a slot 260 formed in a hemispherical member 262. This member in turn is mounted on a shaft having an axis of oscillation 264. This member in turn is mounted on a shaft having an axis of oscillation 264. This shaft is connected to the rotor of a potentiometer 266 supported by a suitable panel plate 268. The shaft with the axis 258 is connected to a second potentiometer 270 situated 90° out of phase with respect to the potentiometer 266.

By rotating the control stick 256 in a clockwise direction, as viewed in FIG. 12, the potentiometer 270 is actuated upon movement of the stick 256 in a direction that will cause rotation of the member 262 about the axis 264. The combined angular displacement about the axes 264 and 258 can take place simultaneously when the control stick 256 is moved in any direction other than the direction of the reference plane of FIG. 11. The two output signals from the potentiometers 266 and 270 then can be used as direct signals. This corresponds to the voltages $E_i$ sine $\theta$ and $E_i$ cosine $\theta$ of FIG. 9.

Regardless of whether the joy stick control of FIGS. 11 and 12 or the resolver control of FIG. 8 is used, the operator may control the motion of the probe as it traverses the surface of the model.

Having thus described preferred forms of my invention, what I claim and desire to secure by U.S. Letters Patent is:

1. A control system for an automatic probe adapted register with characteristic surface points on a three-dimensional surface comprising a control arm adapted to carry said probe, a movable arm mounting member carrying said control arm, a first servo motor means connected drivably to said arm for advancing and retracting the same in the direction of a first coordinate axis, a support for said arm mounting member, said arm mounting member being mounted on said support for secondary movement in the direction of a second rectangular coordinate axis, second servomotor means adapted to effect such secondary movement, a movable base carrying said support, third servomotor means for moving said base in the direction of a third coordinate axis, a control transmitter and a control transformer electrically coupled, the transmitter and the transformer comprising rotor and stator windings, one of the windings of said control transformer being connected to the driven portions of one of said servo motor means, the other winding of said control transformer being electrically coupled to one winding of said control transmitter, first steering control means for manually adjusting the angularity of the other winding of said control transmitter, an electrical connection including a voltage amplifier subcircuit connecting said control transformer windings to said one servomotor means, a second control transformer and a second control transmitter, each having stator and rotor windings, second steering control means for manually adjusting the angularity of one winding of said second control transmitter, the other winding of said second control transmitter being electrically coupled to one winding of said second control transformer, the other winding of said second control transformer being connected mechanically to the driven portions of said second servomotor means, the voltage developed in said other winding of said second control transformer being proportional to the relative angular displacement between it and the one winding of said second control transmitter, an electrical connection between the input side of said second servo motor means and said other winding of said second control transformer including an amplifier subcircuit, and a closed servo feedback loop circuit means for energizing another of said servo means, said loop circuit means including an input element connected to said probe and an output element connected to said third servo motor means.

2. A control system for an automatic probe adapted to register with characteristic surface points on a three-dimensional surface comprising a control arm adapted to carry said probe, a movable arm mounting member carrying said control arm, the first servomotor means connected drivably to said arm for advancing and retracting the same in the direction of a first coordinate axis, a support for said arm mounting member, said arm mounting member being mounted on said support for secondary movement in the direction of a second rectangular coordinate axis, second servomotor means adapted to effect such secondary movement, a movable base carrying said support, third servomotor means for moving said base in the direction of a third coordinate axis, a control transmitter and a control transformer electrically coupled, the transmitter and the transformer comprising rotor and stator windings, one of the windings of said control transformer being connected to the driven portions of one of said servomotor means, the other winding of said control transformer being electrically coupled to one winding of said control transmitter, first steering control means for manually adjusting the angularity of the other winding of said control transmitter, and electrical connection including a voltage amplifier subcircuit connecting said control transformer winding to said one servomotor means, a second control transformer and a second control transmitter, each having stator and rotor windings, second steering control means for manually adjusting the angularity of one winding of said second control transmitter, the other winding of said second control transmitter being electrically coupled to one winding of said second control transformer, the other winding of said second control transformer being connected mechanically to the driven portions of said second servomotor means, the voltage developed in said other winding of said second control transformer being proportional to the relative angular displacement between it and the one winding of said second control transmitter, an electrical connection between the input side of said second servomotor means and said other winding of said second control transformer including an amplifier subcircuit, and a closed servo loop system for energizing the servo motor means for another of said coordinate axes comprising a control differential transformer having a signal input element, said control differential transformer developing an output voltage that is proportional in magnitude to the displacement of said input element, said probe comprising a movable probe tip engageable with said surface, means for mounting said tip for motion about multiple axes as it is engaged by said surface, a universal motion transmitting connection between said tip mounting means and said input element of said control differential transformer, whereby said probe is adjusted automatically in the direction of said other axis as the motion components in the direction of other coordinate axes are controlled through the medium of said control transmitters and control transformers.

3 The combination as set forth in claim 1 wherein a voltage tachometer is connected drivably to said second and third servomotor means, the connection between each control differential transformer and its associated servomotor means including an electrical voltage summing point, said tachometer developing an output voltage that is proportional in magnitude to the driven speed of said servomotor means, and an electrical connection between said summing point and said tachometer whereby the voltage of the latter opposes the output voltage of the associated control transformer.

4. The combination as set forth in claim 2 wherein a voltage tachometer is connected drivably to said second and third servomotor means, the connection between each control differential transformer and its associated servomotor means including an electrical voltage summing point, said tachometer developing an output voltage that is proportional in magnitude to the driven speed of said servomotor means, and an electrical connection between said summing point and said tachometer whereby the voltage of the latter opposes the output voltage of the associated control transformer.

5. The combination as set forth in claim 1 wherein said subcircuits include an electrical resolver comprising a pair of stator windings situated out of phase with respect to each other, a rotor winding adapted for rotary displacement with respect to said resolver stator windings, means for impressing upon said resolver rotor windings a known, controlled voltage, an electrical connection between one o said resolver stator windings and the input side of one servo motor means and another electrical connection between the other resolver stator winding and the input side of another of said servomotor means, and means for varying the angular displacement of said resolver rotors with respect to the resolver stator windings thereby developing control voltages in each of said two servomotor means to accomplish steering control of said probe in two axes.

6. The combination as set forth in claim 2 wherein said subcircuits include an electrical resolver comprising a pair of stator windings situated out of phase with respect to each other, a rotor winding adapted for rotary displacement with respect to said resolver stator windings, means for impressing upon said resolver rotor windings a known, controlled voltage, an electrical connection between one of said resolver stator windings and the input side of one servo motor means and another electrical connection between the other resolver stator winding and the input side of another of said servomotor means, and means for varying the angular displacement of said resolver rotors with respect to the resolver stator windings thereby developing control voltages in each of said two servomotor means to accomplish steering control of said probe in two axes.

7. The combination as set forth in claim 6 wherein the closed servo loop system includes the servomotor means for the other of said coordinate axes establishing an automatic response to said last-named servomotor means as variations in the coordinate position of the probe with respect to the other two axes is changed upon adjustment of the respective control transmitters.

8. A control system for an automatic probe adapted to register with characteristic surface points on a three-dimensional surface comprising a control arm adapted to carry said probe, a movable arm mounting member carrying said control arm, first servo motor means connected drivably to said arm for advancing and retracting the same in the direction of a first coordinate axis, a support for said arm mounting member, said arm mounting member being mounted on said support for secondary movement in the direction of a second rectangular coordinate axis, second servomotor means adapted to effect such secondary movement, a movable base carrying said support, third servomotor means for moving said base in the direction of a third coordinate axis, a control transmitter and a control transformer electrically coupled, the transmitter and the transformer comprising rotor and stator windings, one of the windings of said control transformer being connected to the driven portions of one of said servomotor means, an electrical connection including a voltage amplifier subcircuit connecting a control transformer winding to said one servomotor means, a second control transformer and a second control transmitter, each having multiple stator windings and a rotor winding, means for manually adjusting the angularity of one winding of said second control transmitter, the other winding of said second control transmitter being electrically coupled to one winding of said second control transformer, the other winding of said second control transformer being connected mechanically to the driven portions of said second servo motor means, the voltage developed in said other winding of said second control transformer being proportional to the relative angular displacement between it and the one winding of said second control transmitter, an electrical connection between the input side of said second servo motor means and said other winding of said second control transformer including an amplifier subcircuit, a pair of potentiometers, each having an adjustable control element and each having a winding impressed with a known supply voltage, a connection between one potentiometer winding and the input side of one of said servomotor means and a corresponding connection between the other potentiometer winding and another servomotor means whereby signal voltages may be distributed to of each said servomotor means to effect steering control of said probe in response to movement of said control elements, and a closed servo feedback loop circuit means for energizing another of said servomotor means, said loop circuit means including an input element connected to said probe and an output element connected to said other servomotor means associated with said feedback loop circuit means.

9. A control system for an automatic probe adapted to register with characteristic surface points on a three-dimensional surface comprising a control arm adapted to carry said probe, a movable arm mounting member carrying said control arm, a first servomotor means connected drivably to said arm for advancing and retracting the same in said arm mounting member in the direction of a first coordinate axis, a support for said arm mounting member, said arm mounting member being mounted on said support for secondary movement in the direction of a second coordinate axis, second servomotor means adapted to effect such secondary movement, a movable base carrying said support, third servomotor means for moving said base in the direction of the third rectangular coordinate axis, control transmitters and control transformers electrically coupled, each transmitter and each transformer comprising rotor and stator windings, one of the windings of each control transformer being connected to the driven portions of separate ones of said servo motor means, an electrical connection including a voltage amplifier subcircuit connecting said control transformers to said separate servomotor means, a closed servo loop system for energizing the servomotor means for another of said coordinate axes comprising a control differential transformer having an input element, said control differential transformer developing an output voltage that is proportional in magnitude to the displacement of said input element, said probe comprising a movable probe tip engageable with said surface, means for mounting said tip for motion about multiple axes as it is engaged by said surface, a universal motion transmitting connection between said tip mounting means and said input element of said control differential transformer, an electrical connection between said control differential transformer and the servomotor means associated said other coordinate axes whereby said probe is adjusted automatically in the direction of said other axis as the motion components in the direction of the other coordinate axes are controlled through the medium of said control transmitters and control transformers, a pair of potentiometers, each having an adjustable control element and each having a winding impressed with a known supply voltage, a connection between one potentiometer winding and the input side of one of said separate servomotor means and a corresponding connection between the other potentiometer winding and another of said separate servomotor means whereby signal voltages may be distributed to said separate servo means to effect steering control of said probe in response to movement of said control elements.